United States Patent
McRory

(10) Patent No.: US 10,465,507 B2
(45) Date of Patent: Nov. 5, 2019

(54) METHOD AND SYSTEM FOR CONTROLLING VOLTAGE APPLIED ACROSS A PIEZOELECTRIC STACK OF A DOWNHOLE ACOUSTIC TRANSMITTER

(71) Applicant: Baker Hughes Oilfield Operations LLC, Houston, TX (US)

(72) Inventor: John Godfrey McRory, Calgary (CA)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 16/080,600

(22) PCT Filed: Mar. 3, 2017

(86) PCT No.: PCT/CA2017/050298
§ 371 (c)(1),
(2) Date: Aug. 28, 2018

(87) PCT Pub. No.: WO2017/147721
PCT Pub. Date: Sep. 8, 2017

(65) Prior Publication Data
US 2019/0017371 A1   Jan. 17, 2019

Related U.S. Application Data

(60) Provisional application No. 62/375,793, filed on Aug. 16, 2016, provisional application No. 62/303,935, filed on Mar. 4, 2016.

(51) Int. Cl.
*E21B 47/16* (2006.01)
*B06B 1/06* (2006.01)
(Continued)

(52) U.S. Cl.
CPC ............. *E21B 47/16* (2013.01); *B06B 1/0611* (2013.01); *E21B 47/065* (2013.01); *G01V 1/22* (2013.01)

(58) Field of Classification Search
CPC ............................ B06B 1/0618; B06B 1/0625
(Continued)

(56) References Cited

U.S. PATENT DOCUMENTS 3,327,286 A  *  6/1967  Dorr ..................... B06B 1/0625
                                                        310/334
5,448,227 A       9/1995  Orban et al.
(Continued)

OTHER PUBLICATIONS

International Search Report and Written Opinion of the International Searching Authority, dated Jun. 22, 2017, for corresponding International Application No. PCT/GB2017/050298, 7 pages.
(Continued)

*Primary Examiner* — Qutbuddin Ghulamali
(74) *Attorney, Agent, or Firm* — Cantor Colburn LLP

(57) ABSTRACT

Methods, systems, and techniques for controlling voltage applied across a piezoelectric stack of a downhole acoustic transmitter. At least one of the temperature of the stack and the compressive stress applied to the stack is monitored. At least one of the temperature of the stack and the compressive stress applied to the stack is compared to a temperature threshold and a stress threshold, respectively. When the stack signal is an alternating voltage signal and when at least one of the temperature of the stack and the compressive stress applied to the stack respectively exceeds the temperature threshold and the stress threshold, the stack signal is modified such that a negative polarity portion of the stack signal has a maximum magnitude less than a magnitude of a negative polarity limit.

19 Claims, 9 Drawing Sheets

(51) Int. Cl.
*E21B 47/06* (2012.01)
*G01V 1/22* (2006.01)

(58) Field of Classification Search
USPC .......................................................... 367/82
See application file for complete search history.

(56) References Cited

U.S. PATENT DOCUMENTS

| | | | | |
|---|---|---|---|---|
| 5,798,488 | A * | 8/1998 | Beresford | B06B 1/0611 175/50 |
| 6,137,747 | A * | 10/2000 | Shah | B06B 1/0611 340/856.4 |
| 6,147,932 | A * | 11/2000 | Drumheller | B06B 1/0611 367/157 |
| 2009/0129203 | A1* | 5/2009 | Jones | G01V 1/40 367/25 |
| 2014/0265565 | A1 | 9/2014 | Cooley et al. | |
| 2016/0016199 | A1* | 1/2016 | Goodman | B06B 1/0625 310/334 |
| 2016/0238720 | A1* | 8/2016 | Gao | E21B 47/16 |
| 2019/0017371 | A1* | 1/2019 | McRory | E21B 47/16 |

OTHER PUBLICATIONS

Drumheller., "Acoustical Properties of Drill Strings," Geothermal Research Division, Sandia National Laboratories, SAND88-0502, UC-66c, Jul. 1988, 68 pages.
Harris Corporation, "Electro-Ceramic Products and Material Specification," booklet, Harris Corporation Jan. 2017 Acoustic Sensors/ Undersea Systems MK, 2017, 46 pages.
Butler et al., "Piezoelectric Ceramic Mechanical and Electrical Stress Study," *J. Accoust. Soc. Am*, vol. 96, No. 3, pp. 1914-1917, Sep. 1994.
Mohan et al. "Chapter 7—Full-Bridge dc-dc Converter," Power Electronics, Converters, Applications, and Design, Third Edition, John Wiley & Sons, Inc., 2003, 10 pages.
Pressman et al., "Switching Power Supply Design, Third Edition", Digital Engineering Library, The McGraw-Hill Companies, 2009, 13 pages.

* cited by examiner

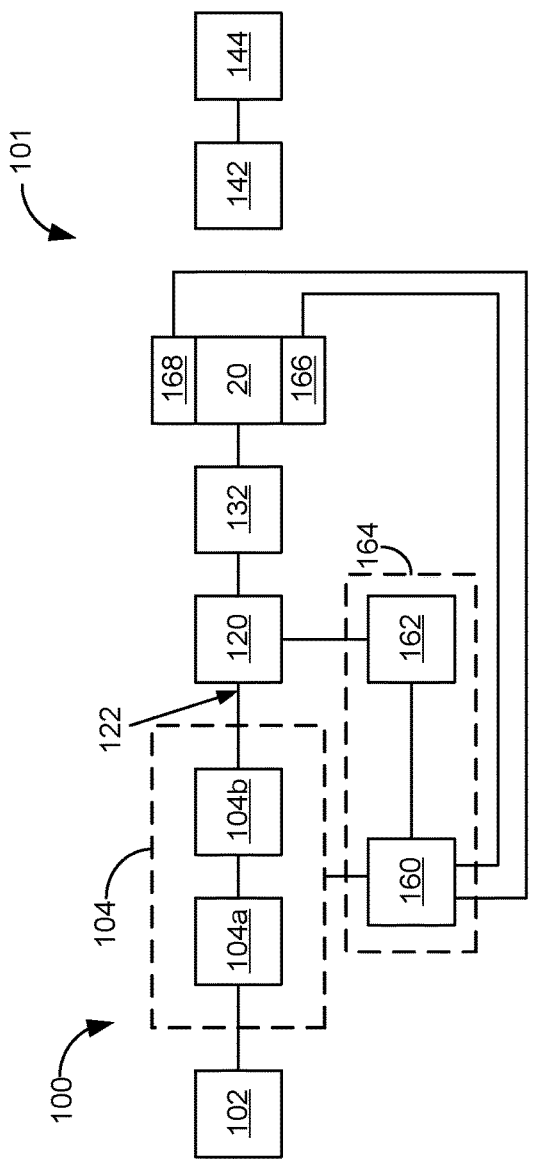
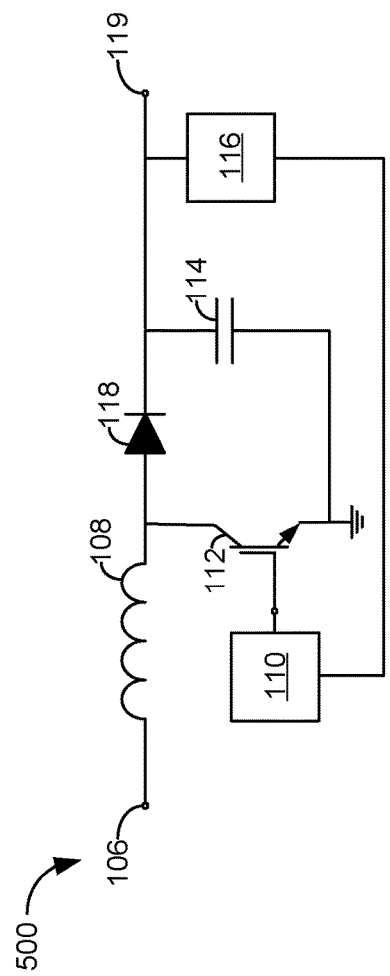
FIG. 4
FIG. 5

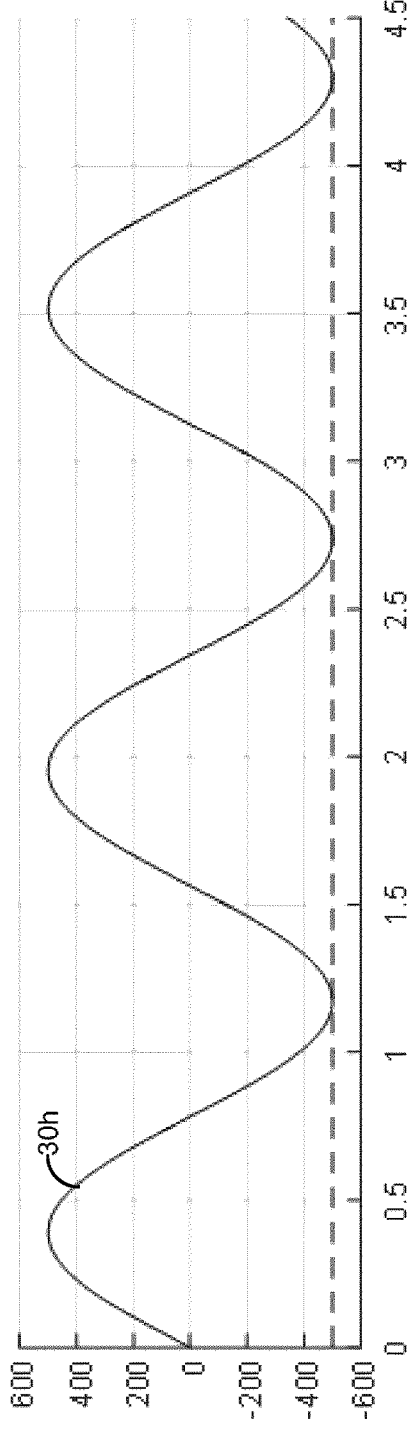
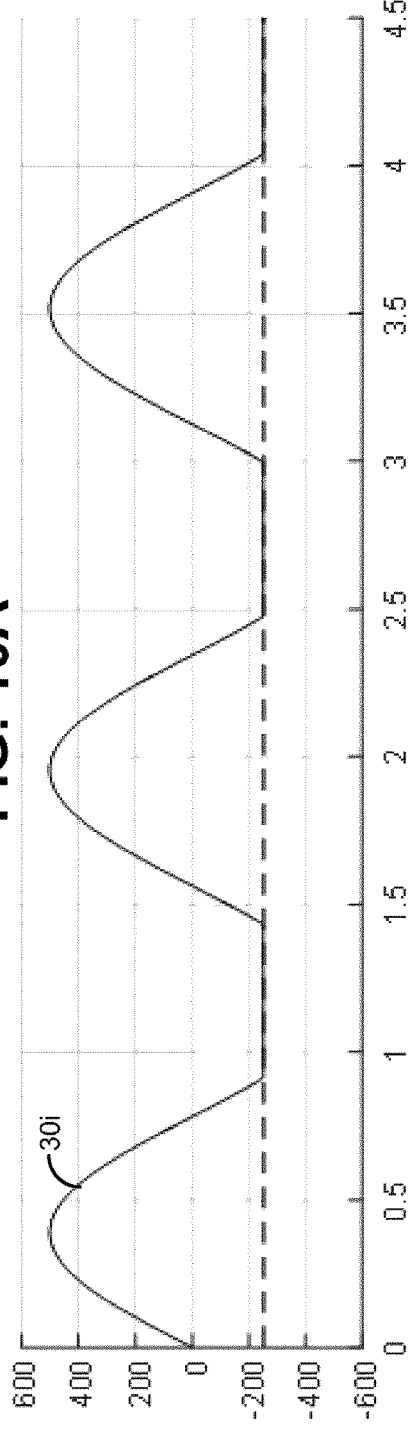
FIG. 10A
FIG. 10B

METHOD AND SYSTEM FOR CONTROLLING VOLTAGE APPLIED ACROSS A PIEZOELECTRIC STACK OF A DOWNHOLE ACOUSTIC TRANSMITTER

CROSS REFERENCE TO RELATED APPLICATIONS

This is the U.S. National Stage of International Application No. PCT/CA2017/050298, filed Mar. 3, 2017, which in turn claims the benefit of and priority to U.S. Provisional Application No. 62/303,935, filed Mar. 4, 2016 and U.S. Provisional Application No. 62/375,793, filed Aug. 16, 2016. The provisional applications are incorporated herein in their entireties.

TECHNICAL FIELD

The present disclosure is directed at methods, systems, and techniques for controlling voltage applied across a piezoelectric stack of a downhole acoustic transmitter.

BACKGROUND

Modern oil well drilling techniques often involve transmitting drilling data between transmission points along a drill string in real-time; this may occur, for example, when performing measurement-while-drilling (MWD) operations. Various sensory devices may be provided along the drill string so that drilling data such as downhole temperature, downhole pressure, drill bit orientation, drill bit RPM, and formation data are transmitted along the drill string towards the surface or further downhole. For example, the drilling data may be sent to a surface controller that updates drilling parameters using the drilling data in order to improve control and efficiency of the drilling operation.

The sensors and equipment used in the downhole tools that transmit the drilling data are subject to extremes of pressure, temperature, and tension/compression that can damage or destroy those components. As the drilling industry continues to evolve to deeper, hotter wells, it is imperative that the components comprising the downhole tools be designed to survive that environment.

SUMMARY

According to one aspect, there is provided an acoustic transmitter for transmitting an acoustic signal through a drill pipe. The transmitter comprises a piezoelectric stack; voltage boost circuitry for boosting a voltage from a voltage source; signal modulation circuitry electrically coupled to the voltage boost circuitry and to the stack, the signal modulation circuitry for applying a stack signal comprising voltage from the voltage source across the stack; at least one of a temperature sensor and a compression sensor positioned to measure a temperature of the stack and compressive stress applied to the stack, respectively; and control circuitry communicatively coupled to the voltage boost circuitry, signal modulation circuitry, and to the at least one of the temperature sensor and the compression sensor. The control circuitry is configured to perform a method comprising monitoring at least one of the temperature of the stack and the compressive stress applied to the stack; comparing at least one of the temperature of the stack and the compressive stress applied to the stack to a temperature threshold and a stress threshold, respectively; and when the stack signal is an alternating voltage signal and when at least one of the temperature of the stack and the compressive stress applied to the stack respectively exceeds the temperature threshold and the stress threshold, modifying the stack signal such that a negative polarity portion of the stack signal has a maximum magnitude less than a magnitude of a negative polarity limit.

The transmitter may comprise the temperature sensor, the compression sensor, or both the temperature and compression sensors.

The voltage boost circuitry may comprise a DC/DC voltage converter that sets a maximum voltage swing across the stack, and modifying the stack signal may comprise adjusting the DC/DC voltage converter such that the maximum voltage swing across the stack is reduced.

Modifying the stack signal may comprise adding a DC offset to the stack signal.

The voltage boost circuitry may comprise a DC/DC voltage converter that sets a maximum voltage swing across the stack, and modifying the stack signal may further comprise adjusting the DC/DC voltage converter to reduce the maximum voltage swing across the stack such that a first polarity portion of the stack signal, which has a polarity identical to the first polarity, is unclipped.

Modifying the stack signal further comprises compensating for the adding of the DC offset by reducing the amplitude of the stack signal such that a first polarity portion of the stack signal, which has a polarity identical to the first polarity, is unclipped.

The DC/DC voltage converter may be adjusted such that the peak magnitude of the first polarity portion of the stack signal after the DC offset is added to the stack signal is identical to a peak magnitude of the first polarity portion of the signal before the DC offset is added to the stack signal.

The stack signal may be scaled such that the peak magnitude of the first polarity portion after the DC offset is added to the stack signal is identical to a peak magnitude of the first polarity portion of the signal before the DC offset is added to the stack signal.

Modifying the stack signal may comprise clipping a negative polarity portion of the stack signal.

According to another aspect, there is provided a method for transmitting an acoustic signal through a drill pipe. The method comprises monitoring at least one of the temperature of a piezoelectric stack for generating the acoustic signal and the compressive stress applied to the stack; comparing the at least one of the temperature of the stack and the compressive stress applied to the stack to a temperature threshold and a stress threshold, respectively; and when the stack signal is an alternating voltage signal and when at least one of the temperature of the stack and the compressive stress applied to the stack respectively exceeds the temperature threshold and the stress threshold, modifying the stack signal such that a negative polarity portion of the stack signal has a maximum magnitude less than a magnitude of a negative polarity limit.

The maximum magnitude of the negative polarity portion of the stack signal may be reduced in response to the temperature of the stack.

The maximum magnitude of the negative polarity portion of the stack signal may be reduced in response to the compressive stress applied to the stack.

The maximum magnitude of the negative polarity portion of the stack signal may be reduced in response to the temperature of the stack and the compressive stress applied to the stack.

A maximum voltage swing across the stack signal may be set by a DC/DC voltage converter, and reducing the maximum magnitude of the negative polarity portion of the stack signal may comprise adjusting the DC/DC voltage converter such that the voltage swing across the stack is reduced.

Reducing the maximum magnitude of the negative polarity portion of the stack signal may comprise adding a DC offset to the stack signal.

A maximum voltage swing across the stack signal may be set by a DC/DC voltage converter, and reducing the maximum magnitude of the negative polarity portion of the stack signal may further comprise adjusting the DC/DC voltage converter to reduce the maximum voltage swing across the stack such that a first polarity portion of the stack signal, which has a polarity identical to the first polarity, is unclipped.

Reducing the maximum magnitude of the negative polarity portion of the stack signal may further comprise compensating for the adding of the DC offset by reducing the amplitude of the stack signal such that a first polarity portion of the stack signal, which has a polarity identical to the first polarity, is unclipped.

The DC/DC voltage converter may be adjusted to reduce the maximum voltage swing across the stack such that the peak magnitude of the first polarity portion of the stack signal after the DC offset is added to the stack signal is identical to a peak magnitude of the first polarity portion of the signal before the DC offset is added to the stack signal.

Reducing the maximum magnitude of the negative polarity portion of the stack signal may comprise clipping the negative polarity portion of the stack signal.

According to another aspect, there is provided an acoustic transmitter for transmitting an acoustic signal through a drill pipe. The transmitter comprises a piezoelectric stack polarized by an initial poling voltage; voltage boost circuitry for boosting a voltage from a voltage source; signal modulation circuitry electrically coupled to the voltage boost circuitry and to the stack, the signal modulation circuitry for applying a stack signal comprising voltage from the voltage source across the stack; at least one of a temperature sensor and a compression sensor positioned to measure a temperature of the stack and compressive stress applied to the stack, respectively; and control circuitry communicatively coupled to the voltage boost circuitry, signal modulation circuitry, and to the at least one of the temperature sensor and the compression sensor. The control circuitry configured to perform a method comprising monitoring at least one of the temperature of the stack and the compressive stress applied to the stack; comparing at least one of the temperature of the stack and the compressive stress applied to the stack to a temperature threshold and a stress threshold, respectively; and when the stack signal is an alternating signal (current and/or voltage) and when at least one of the temperature of the stack and the compressive stress applied to the stack respectively exceeds the temperature threshold and the stress threshold, reducing a maximum difference between the initial poling voltage and the stack signal such that the maximum difference is less than or equal to a difference between the initial poling voltage and a reverse polarity limit.

The transmitter may comprise the temperature sensor, the compression sensor, or both.

The voltage boost circuitry may comprise a DC/DC conversion stage for amplifying the voltage source, and reducing the maximum difference between the initial poling voltage and the stack signal may comprise reducing amplification of the DC/DC conversion stage.

Reducing the maximum difference between the initial poling voltage and the stack signal may comprise adding a DC offset to the stack signal.

The voltage boost circuitry may comprise a DC/DC conversion stage for amplifying the voltage source. Reducing the maximum difference between the initial poling voltage and the stack signal may further comprise reducing amplification of the DC/DC conversion stage such that a forward polarity portion of the stack signal is unclipped, with the forward polarity portion being of identical polarity as the initial poling voltage.

The amplification of the DC/DC conversion stage may be reduced such that the peak magnitude of the forward polarity portion of the stack signal after the DC offset is added to the stack signal is identical to a peak magnitude of the forward polarity portion of the signal before the DC offset is added to the stack signal.

Reducing the maximum difference between the initial poling voltage and the stack signal may comprise clipping a reverse polarity portion of the stack signal, with the reverse polarity portion being of opposite polarity as the initial poling voltage.

According to another aspect, there is provided a method for transmitting an acoustic signal through a drill pipe. The method comprises monitoring at least one of the temperature of a piezoelectric stack for generating the acoustic signal and the compressive stress applied to the stack, wherein the stack is polarized by an initial poling voltage; comparing the at least one of the temperature of the stack and the compressive stress applied to the stack to a temperature threshold and a stress threshold, respectively; and when the stack signal is an alternating signal (current and/or voltage) and when at least one of the temperature of the stack and the compressive stress applied to the stack respectively exceeds the temperature threshold and the stress threshold, reducing a maximum difference between the initial poling voltage and the stack signal such that the maximum difference is less than or equal to a difference between the initial poling voltage and a reverse polarity limit.

The maximum difference between the initial poling voltage and the stack signal may be reduced in response to the temperature of the stack, the compressive stress applied to the stack, or both.

The stack signal may be amplified by a DC/DC conversion stage prior to being applied to the stack, and reducing the maximum difference between the initial poling voltage and the stack signal may comprise reducing amplification of the DC/DC conversion stage.

Reducing the maximum difference between the initial poling voltage and the stack signal may comprise adding a DC offset to the stack signal.

The stack signal may be amplified by a DC/DC conversion stage prior to being applied to the stack. Reducing the maximum difference between the initial poling voltage and the stack signal may further comprise reducing amplification of the DC/DC conversion stage such that a forward polarity portion of the stack signal is unclipped, with the forward polarity portion being of identical polarity as the initial poling voltage.

The amplification of the DC/DC conversion stage may be reduced such that the peak magnitude of the forward polarity portion of the stack signal after the DC offset is added to the stack signal is identical to a peak magnitude of the forward polarity portion of the signal before the DC offset is added to the stack signal.

Reducing the maximum difference between the initial poling voltage and the stack signal may comprise clipping a reverse polarity portion of the stack signal, with the reverse polarity portion being of opposite polarity as the initial poling voltage.

According to another aspect, there is provided a non-transitory computer readable medium having encoded thereon computer program code that is executable by a processor and that, when executed by the processor, causes the processor to perform any of the foregoing aspects of the method and suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments:

FIG. 4 depicts a block diagram of an acoustic transmission system, according to one example embodiment.

FIG. 5 depicts a circuit schematic of an example voltage converter, which comprises part of the acoustic transmitter of FIG. 4.

FIGS. 8, 9, 10A, and 10B depict example stack signals for application across a piezoelectric stack comprising part of an acoustic transmitter, according to one embodiment.

DETAILED DESCRIPTION

Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment.

Additionally, the term "couple" and variants of it such as "coupled", "couples", and "coupling" as used in this description is intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

Furthermore, the singular forms "a", "an", and "the" as used in this description are intended to include the plural forms as well, unless the context clearly indicates otherwise.

Downhole acoustic telemetry is a method of communication used in the drilling and completions industry to carry measurement information from downhole tools to a receiver located on a drilling rig at the surface, and to transmit control information and data from the surface rig to the downhole tools. It is also used to transfer data, such as measurement information and control signals, between downhole tools deployed in an array along the length of the drill string.

Figure 1:
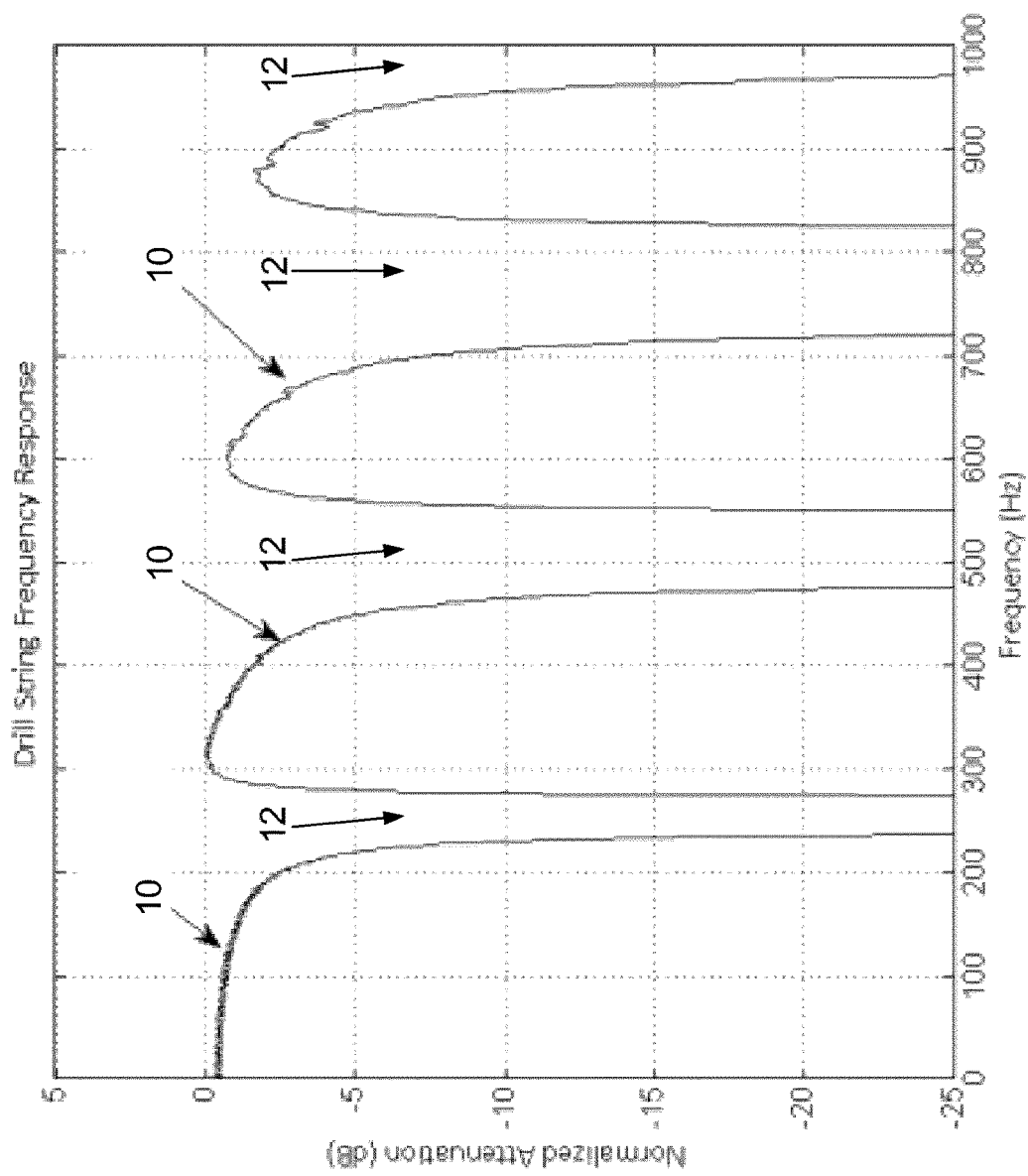
FIG. 1 is a graph depicting an example frequency response of a drill string.

The transmission medium for acoustic telemetry is the drill pipe. The acoustic transmitter is situated within a tool located along the drill pipe and launches an extensional wave modulated with data into the drill pipe. A series connection of several segments of drill pipe of similar size and dimensions forms an acoustic frequency response similar to that of a comb filter, as shown in FIG. 1. The frequency response of FIG. 1 comprises a number of frequency passbands 10 alternating with stopbands 12. This response was first successfully analyzed by D. Drumheller and published as "Acoustical properties of drill strings", The Journal of the Acoustical Society of America, vol. 83, issue 3, March 1989. The bandwidth available to be used by the modulated signal is limited by the bandwidth of the acoustic passband of the acoustic transmission medium; however, the signal can be transmitted in more than one passband simultaneously, which increases the total bandwidth of the signal and hence the data rate. The acoustic signal travels to the surface, either directly or through repeaters comprising part of the drill string, where a surface receiver receives and decodes it.

In a typical drilling or completions environment, several acoustic tools can be spaced along the length of the drill string. The number of tools and spacing is determined by the measurements required at the various tool locations and the need for repeaters if the distance to the surface is too far to transmit successfully with a single tool. Each of the tools in the drill string that communicates using acoustic telemetry is capable of launching an acoustic wave into the drill string to carry the data. The wave is typically an extensional wave of sufficient amplitude to travel several thousand feet within and along the drill string and still have a signal to noise ratio at the receiver sufficient to permit detection and demodulation of the signal.

Figure 2B:
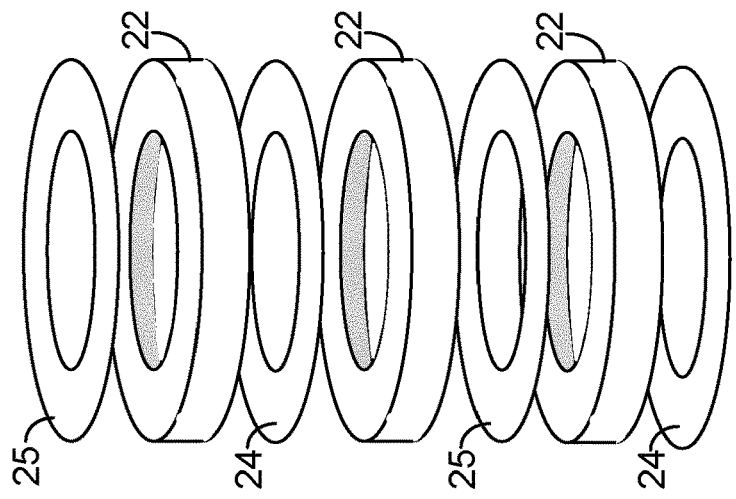
FIG. 2B is an exploded view of a portion of the piezoelectric stack of FIG. 2A.
Figure 2A:
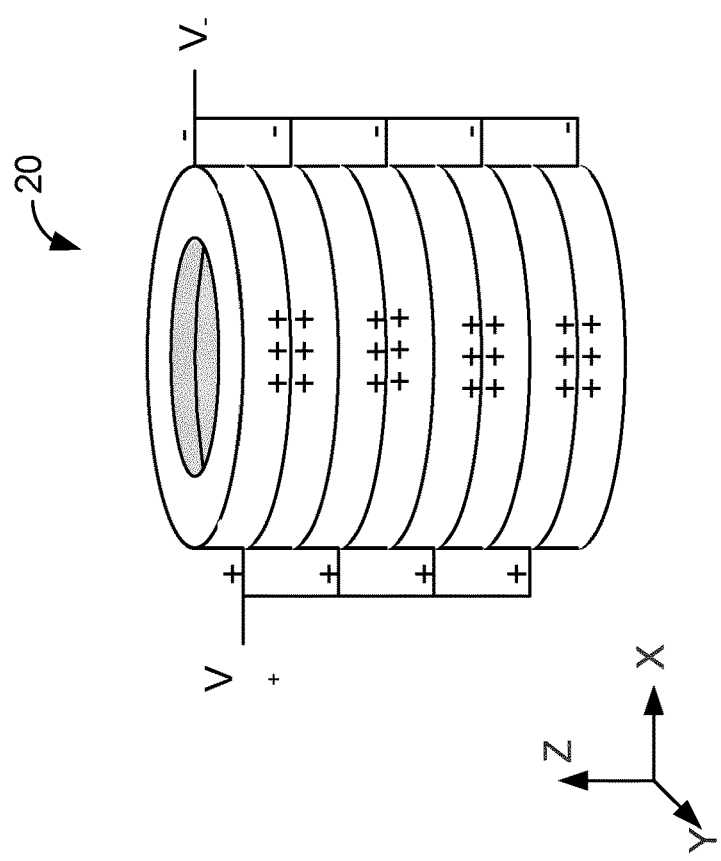
FIG. 2A is a perspective view of a piezoelectric stack comprising part of an acoustic transmitter, according to one embodiment.

In some embodiments and as depicted in FIGS. 2A and 2B, the electromechanical transducer used to generate the acoustic extensional waves within the drill pipe is a large cylindrical piezoelectric stack 20 mounted on a mandrel (not shown), with the stack constrained within an annular space within the tool as shown in more detail in U.S. Pat. No. 6,147,932, the entirety of which is incorporated by reference herein. FIG. 2A shows a perspective view of the stack 20 while FIG. 2B shows an exploded view of a portion of the stack 20. The stack 20 comprises layers of thin piezoelectric ceramic discs 22 that are mounted on the mandrel and constrained between two metal shoulders (not shown). Thin metal electrodes 24,25 are interleaved between the discs 22. Positive electrodes 24 are electrically shorted together, and negative electrodes 25 are electrically shorted together, thus electrically connecting the discs 22 in parallel. As discussed in further detail below, the stack 20 is driven by an alternating high voltage signal ("stack signal") that causes the piezoelectric material to expand or contract, producing the extensional waves within the drill pipe.

During the manufacturing of the stack 20, the piezoelectric effect is created within the ceramic material by a process known as poling, in which the material is subjected to a high DC voltage ("initial poling voltage") of a positive polarity directed along one of the material's available poling axes while being held at a high temperature. As a result, following poling the material expands or contracts along the poling stack axis in a response proportional to the amplitude and polarity of an applied voltage. The ceramic material is mechanically very durable; however, the piezoelectric response of the material can be degraded or ultimately destroyed by applying any one or more of high temperature, excessive compressive forces, and a high electric field that has a polarization opposite that of the initial poling voltage. For convenience, the polarity of a voltage that causes the stack to expand or contract in the same direction as the initial poling voltage does immediately after the initial poling voltage is used to polarize the stack 20 is referred to interchangeably herein as the "positive polarity" or a "forward polarity", and a voltage having this polarity is referred to as a "positive voltage". A voltage having a polarity opposite the positive or forward polarity is referred to interchangeably herein as being of a "negative polarity" or a "reverse polarity", and a voltage having this polarity is referred to as a "negative voltage". Additionally, in different embodiments (not depicted) and depending on measurement convention, the "forward polarity" may correspond to a measured negative polarity, and the "reverse polarity" may correspond to a measured positive polarity, as measured and displayed on a device such as an oscilloscope.

A common piezoelectric material used in downhole acoustic transducers is Navy Type III hard lead zirconate titanate. This is a highly stable material with a maximum positive voltage of 800 V/mm and a maximum negative voltage of −400 V/mm. The Curie temperature of the material is 300° C., which results in a maximum operating temperature of 150° C. in order to avoid any depoling effects. The positive and negative voltage limits are determined at 25° C. and degrade with increased temperature. The Curie temperature is determined without mechanical bias or electrical bias, and decreases as a function of applied AC field strength and compressive mechanical loading.

Typically the maximum limits for each of temperature, compressive force, and electric field of the stack 20 are separately determined and specified; however, notwithstanding this the effect of these factors is cumulative. For example, the maximum electric field level to which the stack 20 may be exposed before its piezoelectric response degrades decreases as the stack temperature increases or the stack compression increases, and if both high temperature and compression are present then the maximum electric field level is reduced further. In the depicted embodiment of the stack 20, the thicknesses of the discs 22 are constant, and consequently electric field is determined from applied voltage (i.e., voltage of the stack signal) and disc thickness.

The physical environment for the downhole tool when placed in the drill string is challenging, offering extremes of pressure, temperature, and tension/compression, all of which vary as a function of placement in the drill string, tool depth, and rig operations. The tool containing the acoustic transmitter and data sensors must be capable of withstanding the downhole environment while maintaining its acoustic transmission capability. Of particular concern are the high temperatures encountered in the deeper portions of the well, and the variations in the piezoelectric compressive preload caused by the fluctuations in tension and compression applied to the tool by the drill string, which when combined reduce the stack's 20 negative electric field limit. These environmental concerns are balanced against the desire to maximize the electric field levels across the stack 20 in order to generate an acoustic signal with sufficient amplitude to permit separations of, for example, 6,000 feet or greater between repeaters or transmitting distance to the surface. As a result, the maximum signal level that can be used in a shallower portion of a well without damaging its piezoelectric response (this voltage is referred to interchangeably herein as the "reverse polarity limit" or the "negative polarity limit") may generate an electric field that exceeds the negative electric field limit when the tool is in the deeper portions of the well where the higher temperatures and compression have reduced the maximum safe negative field of the piezoelectric material, consequently leading to depolarizing of the stack. However, if the magnitude of the voltage of the stack signal is reduced such that the magnitude of the maximum negative electric field does not exceed the magnitude of the negative field limit for the higher temperature and compression cases for deeper portions of the well, then the depolarization of the stack can be reduced or avoided, but the reduced voltage level will reduce the maximum tool separation for the shallower operational cases.

Figure 3:
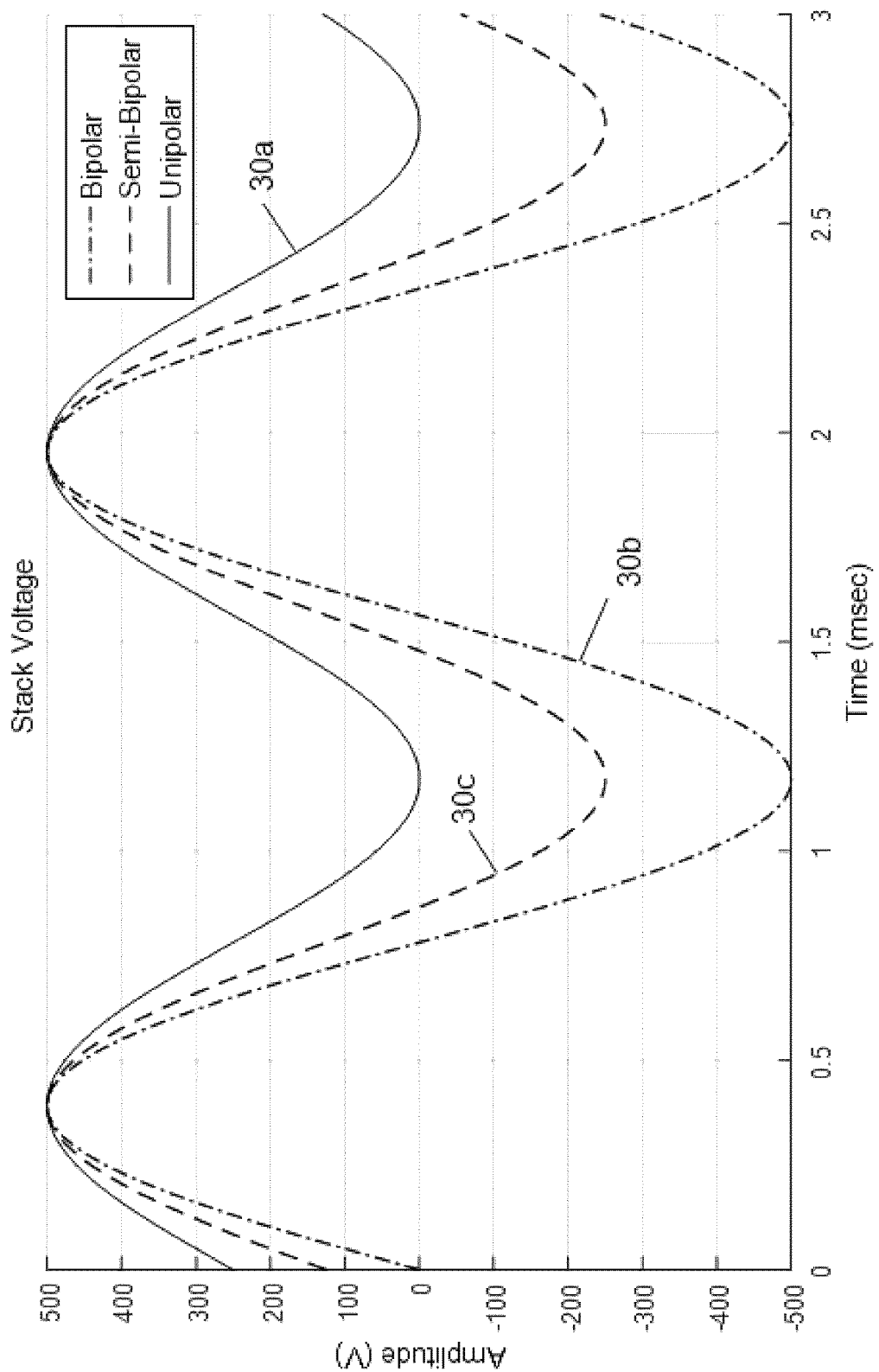
FIG. 3 depicts example bipolar, semi-bipolar, and unipolar stack signals.

FIG. 3 shows three stack signals 30a,b,c (collectively, "signals 30") that may be applied across a stack 20 that was exposed to a positive electric field during poling generated by a positive initial poling voltage: a first signal 30a is "unipolar" in that it has a DC offset of the same polarity as the initial poling voltage and of a sufficient magnitude that the AC component of signal 30a does not extend below the zero voltage level; a second signal 30b is "bipolar" in that it is centered at the zero voltage level and equally swings in both positive and negative polarities; and a third signal 30c is "semi-bipolar" in that it also has a DC offset of the same polarity as the initial poling voltage but the offset is insufficient to prevent some negative polarization. While the depicted signals 30 are sinusoidal in nature, in different embodiments (not shown) the signals 30 applied across the stack 20 may be non-sinusoidal or only partially sinusoidal.

High voltage piezoelectric stacks are typically operated in the unipolar mode with the positive polarity of the stack signal helping to maintain poling of the stack 20. However, in the case of downhole acoustic telemetry the stack signal is usually bipolar in order to maximize the output amplitude of the acoustic wave and to maximize the electrical efficiency of the acoustic transmitter. The amplitude of the bipolar signal is limited by the negative polarity limit of the stack signal 30, which defines the peak negative voltage that can be applied to the piezoelectric material before depoling begins. Piezoelectric ceramics may be partially or completely depolarized by the application of a high negative electric field; the maximum negative field is the limiting factor, and that magnitude can be as low as half of the maximum positive field. For example, a material with an 800 V/mm maximum positive field may have a −400 V/mm maximum negative field. This is true for applied fields that are DC or AC in nature.

Since the magnitude of the maximum negative field for the piezoelectric material is lower than, and in this example half, the magnitude of its maximum positive field, using a bipolar signal can result in a long-term loss of poling and eventual failure of the stack 20. In respect particularly of downhole use of the stack 20, in the deeper portions of the well in which the stack 20 is exposed to high temperatures and compression, the maximum negative field limit can be reduced enough that the negative swings of the bipolar signal, which typically would not depole the stack 20, do in fact damage the stack.

In summary, the piezoelectric material used in the stack of a downhole acoustic transmitter can be depoled by the negative polarity portions of the drive signal when the stack is exposed to high temperatures and compressive forces at deep well depths even though an identical signal does not cause damage under the cooler temperatures and lower pressures that the stack experiences at shallower depths. The embodiments described herein are directed at methods, systems, and techniques for controlling voltage applied across the piezoelectric stack such that that depoling that can occur at deep well depths from applying higher voltages to the piezoelectric stack is mitigated while still allowing use of those higher voltages and resulting electric field strengths for better performance at shallower well depths.

Referring now to FIG. 4, there is shown a block diagram of an acoustic transmission system 101, according to one embodiment. The acoustic transmission system 101 comprises an acoustic transmitter 100, a receiver 142 configured to receive the acoustic signal after it has been transmitted through the drill string, and a demodulator 144 communicatively coupled to the receiver 142 to recover transmitted data. The transmitter 100 comprises a voltage source in the form of a battery 102, voltage boost circuitry in the form of a voltage converter 104, signal modulation circuitry in the form of switching circuitry 120 and stack charge control circuitry 132, a piezoelectric transducer in the form of the piezoelectric stack 20, control circuitry 164, a temperature sensor 166 positioned to monitor the temperature of the stack 20, and a compressive stress sensor 168 positioned to monitor the compressive stress that the stack 20 experiences. In one example embodiment, the temperature sensor 166 is mounted on a circuit board in the transmitter 100 and does not directly contact the stack 20, but is sufficiently near the stack 20 such that the temperature that the sensor 166 measures is practically treated as the temperature of the stack 20; in this embodiment, one example sensor is an Analog Devices™ AD22100 integrated sensor. In another embodiment, the temperature sensor comprises a thermocouple directly attached to the stack 20. Additionally, in one example embodiment, the stress sensor 168 comprises a strain gauge, such as a stick-on strain gauge, directly mounted to the stack 20. The control circuitry 164 comprises a controller 160 communicatively coupled to the voltage converter 104 and a pulse width modulation (PWM) modulator 162 communicatively coupled to the switching circuitry 120, with the PWM modulator 162 also communicatively coupled to and controlled by the controller 160. Each of the sensors 166,168 is also communicatively coupled to the controller 160. The battery 102 comprises a portable low voltage DC tool battery, such as a 32 V battery. The voltage converter 104 comprises a single or multiple stage DC/DC voltage converter coupled to the battery 102 to boost the battery voltage to a suitable supply voltage for eventual application to the piezoelectric stack 20. For example, in FIG. 4 the voltage converter 104 comprises multiple stages: a first stage DC/DC converter 104a amplifying a 32 V battery output to 90 V, and a second stage DC/DC converter 104b amplifying the 90 V first stage output to 500 V. The voltage converter 104 supplies power to the switching circuitry 120 and accordingly sets a maximum voltage swing across the stack 20. As described below, the switching circuitry 120 applies the voltage that the voltage converter 104 outputs to the piezoelectric stack 20 through the charge control circuitry 132 in accordance with a PWM signal sent by the PWM modulator 162 to a control terminal of the switching circuitry 120. As discussed in more detail in FIG. 4 below, the charge control circuitry 132 in the depicted embodiments comprises a symmetric pair of inductors used to accurately control the charge delivered to the stack 20 over each cycle of the PWM signal. A "symmetric pair" of inductors refers to a pair of inductors having substantially equal inductances, with one of the inductors connected to one terminal of the stack 20 and the other inductor connected to the other terminal of the stack 20.

In the depicted example embodiment the controller 160 comprises a digital signal processor that outputs control signals to the PWM modulator 162 and the voltage converter 104 in response to the input data from the temperature sensor 166 and the compressive sensor 168, but in alternative embodiments may comprise a processor, microcontroller, or other suitable analog, digital, or mixed signal circuit.

FIG. 5 is an example schematic diagram of a simple DC/DC boost converter 500 that may be used as either of the first or second stage DC/DC converters 104a,104b. The converter 500 comprises an input voltage terminal 106 electrically connected in series to an inductor 108 and a diode 118. The output voltage at the cathode of the diode 118 is the boost converter's high voltage output terminal 119. The collector of an IGBT junction transistor 112 ("driving transistor 112") is connected between the inductor 108 and the diode 118, and the driving transistor's 112 emitter is connected to ground. The output terminal 119 is also connected to ground via a capacitor 114. Voltage sensing circuitry 116 is connected to the output terminal 119 and a pulse modulator 110 is connected to the driving transistor's 112 base. The voltage sensing circuitry 116 and output terminal 119 are connected to each other in series and collectively comprise a feedback loop that maintains the output terminal at a desired voltage; the pulse modulator 110 turns the driving transistor 112 on or off depending on whether the voltage at the output terminal 119 exceeds a reference voltage set by the controller 160. The operation of the boost switching converter 300 is well understood by those versed in the art, and is described in detail in *Switching Power Supply Design*, A. Pressman et al., pp 31-40.

Switching Circuitry

Figure 6:
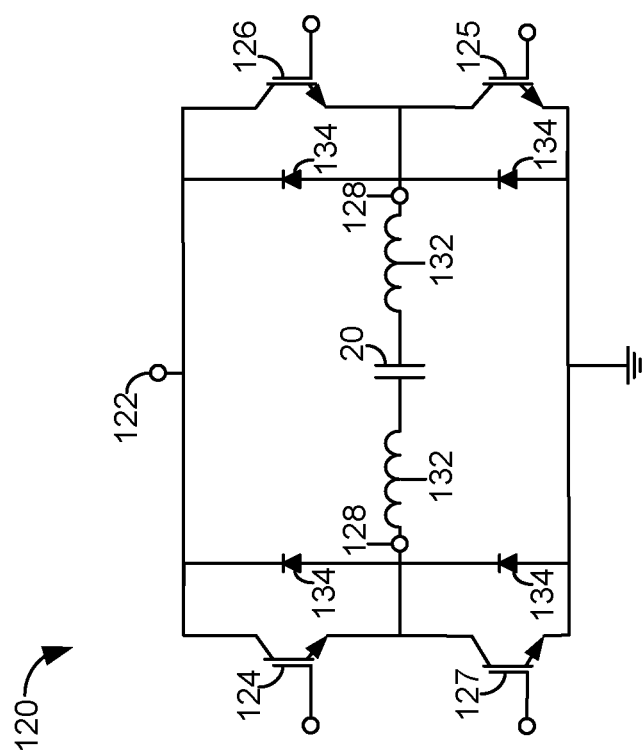
FIG. 6 depicts a circuit schematic of example switching circuitry, which comprises part of the acoustic transmitter of FIG. 4.

FIG. 6 is an embodiment of the switching circuitry 120 comprising part of the transmitter 100 of FIG. 4. The switching circuitry 120 comprises an H-bridge that has a supply terminal 122 that is couplable to a voltage source, such as the output of the voltage converter 120. The H-bridge also comprises a first pair of diagonally opposed transistors 124,125, a second pair of diagonally opposed transistors 126,127, and a pair of output terminals 128 that are electrically connected across the charge control circuitry 132 and the piezoelectric stack 20, which are connected together in series. The transistors 124,125,126,127 may be any suitable type of high voltage switching device, such as MOSFETs or BJTs, but in the depicted example embodiment are shown as IGBTs. Each of the transistors 124,125,126, 127 is driven by suitable high-side and low-side drivers (not shown); an example driver is the International Rectifier™ IR2112 driver. The transistors' 124,125,126,127 gates collectively comprise the control terminal of the switching circuitry 120, and the signal applied to these gates varies in response to the drive signal the PWM modulator 162 outputs. When the drive signal turns the first pair of diagonally opposed transistors 124,125 on and the second pair of diagonally opposed transistors 126,127 off, voltage from the voltage source is applied across the output terminals in a positive polarity; conversely, when the drive signal turns the first pair of diagonally opposed transistors 124,125 off and the second pair of diagonally opposed transistors 126,127 on, voltage from the voltage source is applied across the output terminals in a negative polarity. The switching circuitry 120 also comprises four freewheeling diodes 134, one of which is connected across the collector and emitter of each of the transistors 124,125,126,127.

In one example embodiment using the switching circuitry 120 of FIG. 6, the supply voltage is 500 V DC, the piezoelectric stack 20 is modeled as having a capacitance of 2.33 µF, and each of the inductors 132 has an inductance of 500 µH. In another example embodiment using the switching circuitry 120 of FIG. 6, the supply voltage is 500 V DC, the piezoelectric stack 20 is modeled as having a capacitance of 2.33 µF, and each of the inductors 132 has an inductance of 940 µF.

While the switching circuitry 120 shown in FIG. 6 comprises an H-bridge, in other embodiments (not depicted) alternative switching circuitry may be used; for example, the switching circuitry 120 may alternatively comprise a half-bridge circuit, a mechanical switching circuit, or a functionally equivalent transistor based switching circuit. In some other embodiments (not depicted), a linear amplifier may be used in addition to or as an alternative to the H-bridge.

Charge Control Circuitry

The composite load comprising the charge control circuitry 132 and the piezoelectric stack 20 are connected across the H-bridge's output terminals 128. This embodiment of the charge control circuitry 132 comprises the symmetric pair of inductors, with one inductor connected to one terminal of the piezoelectric stack 20 and the other inductor connected to the other terminal of the piezoelectric stack 20. While the depicted embodiment shows the charge control circuitry 132 comprising only two inductors, in alternative embodiments (not depicted) one or both of these inductors comprising the symmetric pair may be replaced with a group of inductors electrically connected together in series. In the depicted example embodiment, the series LC resonance created by the inductors and the piezoelectric stack 20 is well above the frequency of the acoustic signal; in FIG. 6, the series resonant frequency of the composite load is greater than three times the frequency of acoustic signal. More generally, the inductors comprising the composite load are selected to survive and operate at the high temperatures experienced downhole and such that total inductance of the composite load permits the transmitter to have a slew rate sufficient for the frequency of the acoustic signal, as discussed in more detail below. Further, the inductors are not used to create a low pass filter with a resistive load as is found in amplifier classes D and E. The size of the inductors is determined by the desired step response in the current of the series LC circuit.

Pulse width modulation is a common modulation method used to drive an H-bridge in applications such as motor control or electronic voltage converters. The generation of a PWM control signal and the operation of an H-bridge are well understood by those versed in the art and are documented in detail in several references including *Power Electronics: Converters, Applications and Design*; Mohan, Underland and Robbins; pp. 188-194.

In this embodiment a PWM representation of the desired acoustic signal is used to drive the H-bridge. The composite load, which is a series LC circuit comprising the piezoelectric stack 20 electrically connected between the two inductors that comprise the charge control circuitry 132, is connected across the output terminals 128 and is subject to a series of alternating rectangular voltage steps at the level of ±$V_s$ applied to the supply terminal 122 with a duty cycle determined by the PWM signal. The resulting current signal through the composite load is a function of the step response of the composite load, which in turn is determined by the value of the series inductors given a fixed capacitive value for the piezoelectric stack 20. The amount of charge transferred to the piezoelectric stack 20 during a cycle of the PWM signal can be controlled by the correct sizing of the series inductors, as discussed below in respect of Equations 1 through 5, which in turn indirectly controls the stack's 20 voltage and deflection.

The step function of the series LC circuit can be simplified if the clock period T for the PWM signal is short enough that a simple linear approximation for the inductor current can be used. For a given inductor value L the inductor current arising from a step in inductor voltage ($V_{ind}$) for small values of T can be approximated as linear with a slope of $V_{ind}/L$. The peak value of the current signal at time T can be approximated as:

$$I_{peak} \cong \frac{V_{ind}T}{L} \qquad (1)$$

The amount of charge Q that flows into the piezoelectric stack 20 over time T is equal to the integral of the current over T as expressed in Equations 2 and 3:

$$Q = \int_0^T I_L dt \cong \frac{I_{peak}T}{2} \qquad (2)$$

$$Q \cong \frac{V_{ind}T^2}{2L} \qquad (3)$$

Assuming a sinusoidal voltage across the piezoelectric stack 20 of $V_{stack}=V_p \sin(\omega t)$ in which ω is the desired radial frequency of the acoustic signal and $V_p$ is the maximum signal voltage across the piezoelectric stack 20, the maximum voltage slew rate and greatest current draw occurs at the zero crossing point of $V_{stack}$. Assuming a sufficiently small value of ωT, the incremental stack voltage required during the clock cycle T starting at t=0 can be approximated as:

$$V_T = V_p \sin(\omega T) \cong V_p \omega T \qquad (4)$$

Then given the capacitance C of the stack 20 and the supply voltage $V_s$, the total series inductance L of the charge control circuitry 132 and consequently the composite load is:

$$L = \frac{V_s}{V_p} \frac{T}{2\omega C} \qquad (5)$$

If the total series inductance L is zero, the voltage across the piezoelectric stack 20 follows that of the drive signal. Conversely, if the total series inductance L is too high, the voltage across the piezoelectric stack 20 is unable to transition quickly enough to accommodate the slew rate required by the acoustic signal. Selecting the total series inductance L in accordance with Equation 5 allows the voltage across the piezoelectric stack 20 to deviate from the drive signal, yet still be sufficiently responsive to the drive signal to accommodate the acoustic signal slew rate.

Figure 7:
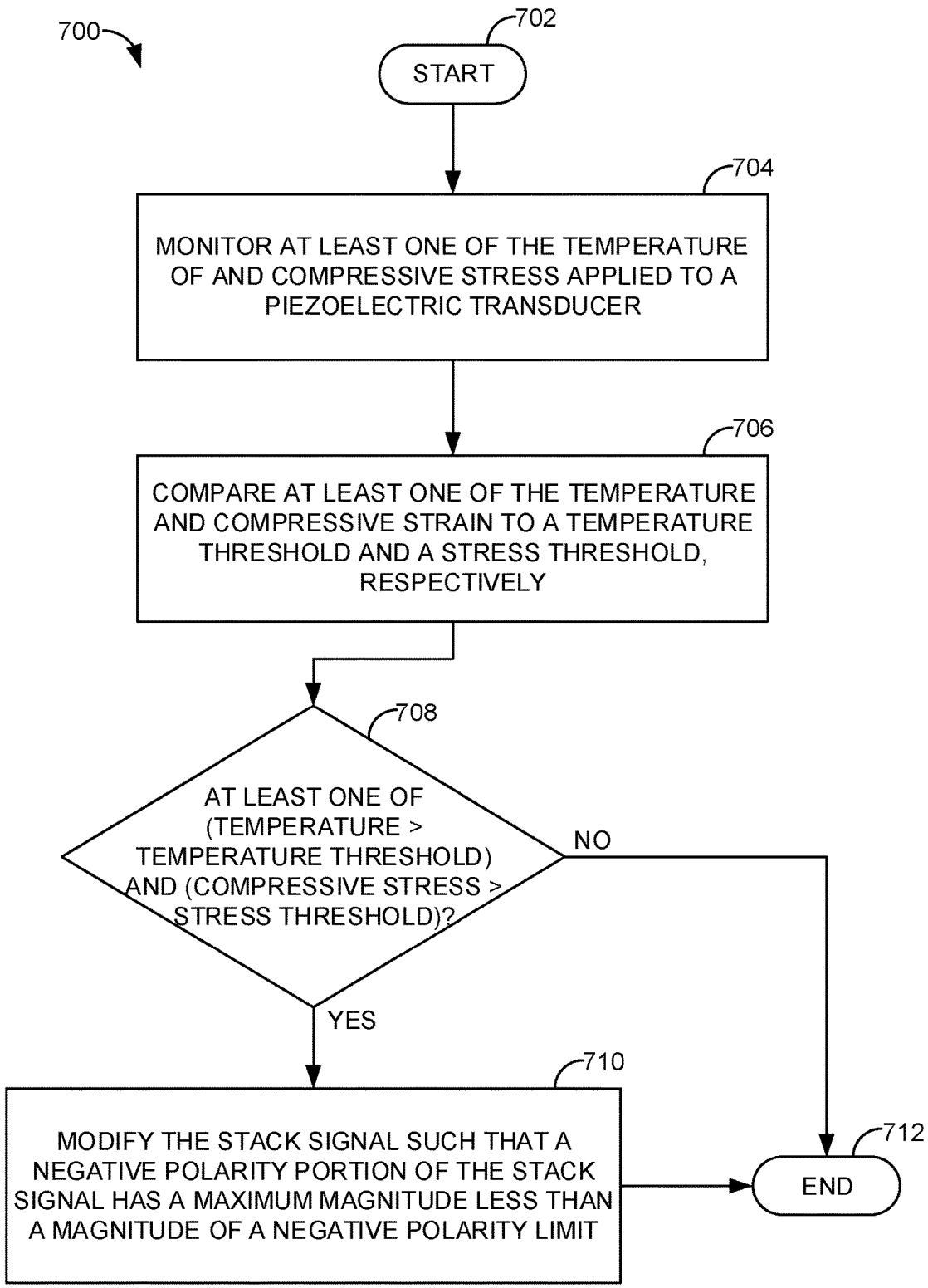
FIG. 7 depicts a method for controlling voltage applied across a piezoelectric stack of a downhole acoustic transmitter, according to one embodiment.

Referring now to FIG. 7, there is shown a method 700 for controlling voltage applied across a piezoelectric stack of a downhole acoustic transmitter, according to another embodiment. As described below in the context of the transmitter 100, the controller 160 controls voltage boost and signal modulation by sending control signals to the voltage converter 104 and the PWM modulator 162, respectively. In an embodiment in which the controller 160 comprises a processor and a non-transitory computer readable medium communicatively coupled to each other, the method 700 may be encoded as program code on the medium that, when executed by the processor, results in the controller 160 performing the method 700.

The controller 160 begins performing the method 700 at block 702 and proceeds to block 704 where it monitors at least one of the temperature of the stack 20 and the compressive stress applied to the stack 20 via the temperature sensor 166 and the stress sensor 168, respectively. In the depicted embodiment the transmitter 100 comprises both of the sensors 166,168; however, in different embodiments (not depicted) the transmitter 100 may comprise only one of the sensors 166,168.

At block 706 the controller 160 compares at least one of the temperature and compressive stress measurements determined from readings the controller 160 has obtained from the sensors 166,168 to a temperature threshold and a compressive stress threshold, respectively. For example, in one embodiment the tool must operate in a downhole environment where ambient temperatures will reach 150° C., and where the compressive forces on the tool can result in mechanical preloads of the piezoelectric stack 20 reaching greater than 10,000 psi. Embodiments in which the controller 160 compares only one of the temperature and compressive stress measurements determined from the sensors 166, 168 comprise embodiments in which the transmitter 100 comprises only one of the sensors 166,168 and embodiments in which notwithstanding the transmitter 100 comprising both of the sensors 166,168, only measurements determined using one of the sensors 166,168 are used.

At block 708 the controller 160 determines whether the temperature of the stack 20 exceeds the temperature threshold, whether the compressive stress applied to the stack 20 exceeds the compressive stress threshold, or both. If the controller 160 does not determine that at least one of the temperature of the stack 20 exceeds the temperature threshold and the compressive stress applied to the stack 20 exceeds the compressive stress threshold, the controller 160 proceeds to block 712 and the method 700 ends without adjusting the voltage of the stack signal as a result of temperature or stress measurements. If, however, the controller 160 determines that at least one of the temperature of the stack 20 exceeds the temperature threshold and the compressive stress applied to the stack 20 exceeds the compressive stress threshold, the controller 160 proceeds to block 710 where it modifies the stack signal such that the negative polarity portion of the stack signal has a maximum magnitude less than a magnitude of the negative polarity limit. In an embodiment in which the stack's 20 polarity is identical to its polarity at initial poling, the controller 160 may implement this by reducing a maximum difference between the initial poling voltage, which for convenience herein is defined as positive, and the stack signal such that the maximum difference is less than or equal to a difference between the initial poling voltage and the negative polarity limit.

FIGS. 8, 9, 10A, and 10B depict various stack signals 30 that illustrate ways in which the controller 160 may modify the stack signal voltage such that the negative polarity portion of the signal does not exceed a negative polarity limit. In embodiments in which the stack's 20 polarity is identical to its polarity at initial poling, that modification may comprise reducing the maximum difference between the initial poling voltage, which for convenience herein is defined as positive, and the stack signal.

Figure 8:
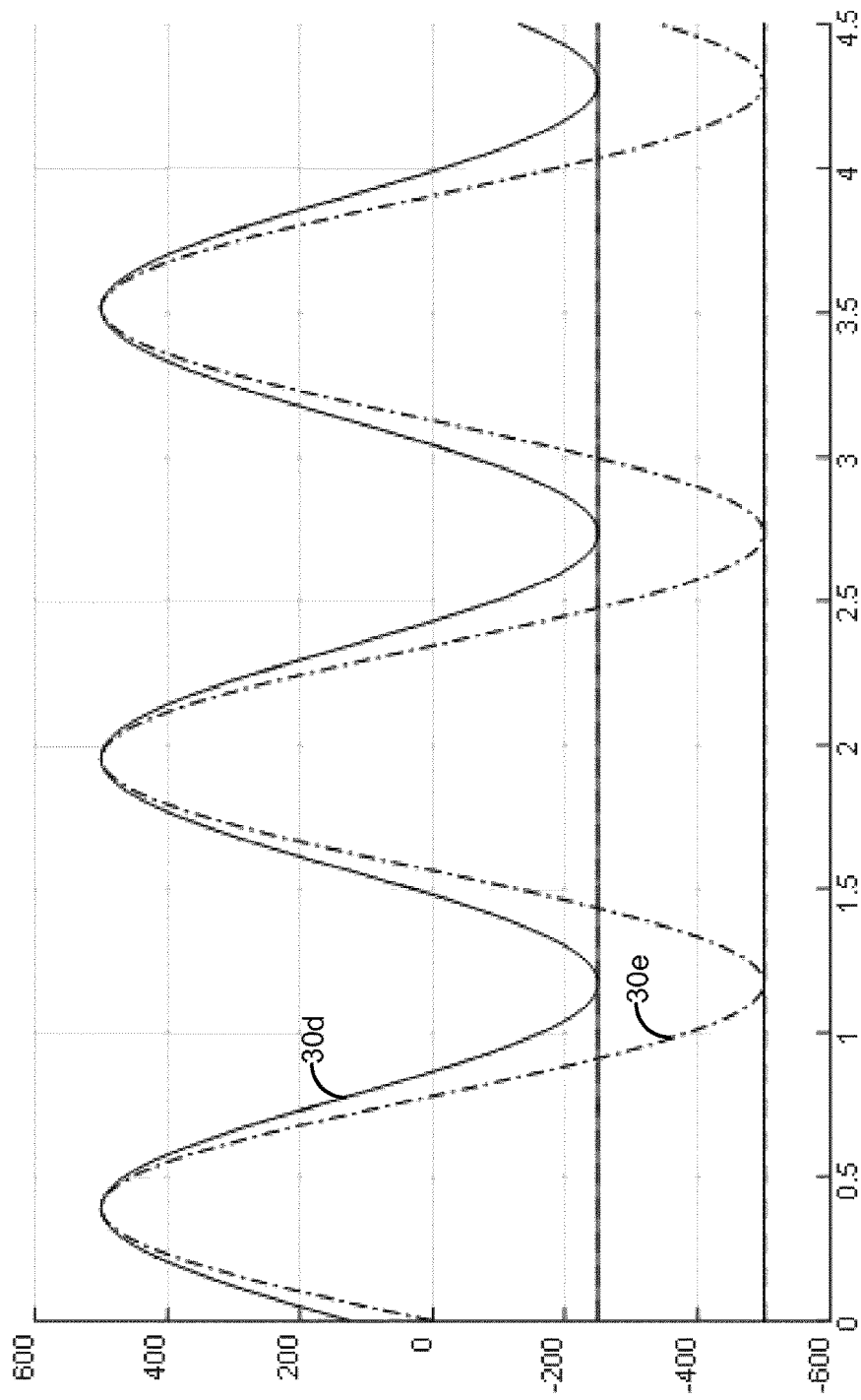

FIG. 8 shows a bipolar signal 30d with a peak voltage of 500 V and a semi-bipolar signal 30e with a peak positive voltage of 500 V and a peak negative voltage of −250 V. In one embodiment, while the bipolar signal 30d may be applied across the stack 20 without damaging it when it is being operated at a relatively shallow depth where its temperature and compressive stress are below the temperature and compressive stress thresholds, respectively, applying a peak negative voltage of −500 V at a deeper depth where at least one of temperature and compressive stress respectively exceed the temperature and compressive stress thresholds begins to depolarize the stack 20. To mitigate this problem, the controller 160 reduces the magnitude of the peak negative voltage of the stack signal 30d by adding a positive DC offset to it by adjusting the PWM signal accordingly. To ensure a positive polarity portion of the signal 30d (which in this example is the positive portion of the signal 30d) is unclipped, the controller 160 also reduces the peak-to-peak voltage of the signal 30d such that the maximum positive voltage of the signal 30d remains 500 V. In both cases, the controller 160 adjusts a reference signal applied to the PWM modulator 162 that is used to generate the PWM signal in order to adjust the stack signal 30d. The result of these actions performed by the controller 160 is that the bipolar signal 30e is converted into the semi-bipolar signal 30d.

Figure 9:
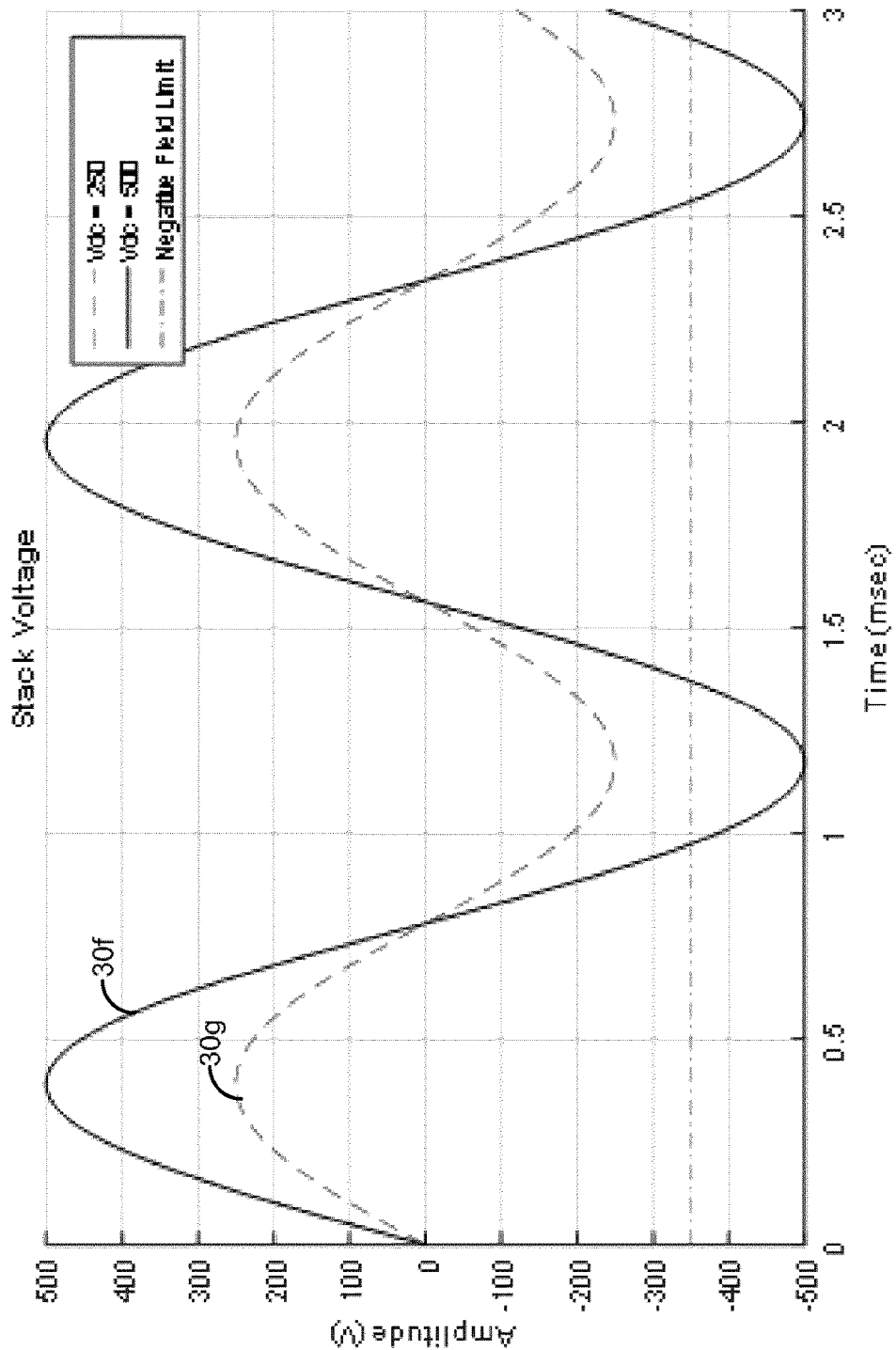

Referring now to FIG. 9, there are shown a first bipolar signal 30f with a peak positive voltage of 500 V and a peak negative voltage of −500 V, and a second bipolar signal 30g with a peak positive voltage of 250 V and a peak negative voltage of −250 V. When the transmitter 100 is operated at a particular depth of a well, the peak negative voltage that may be applied across the stack 20 before depolarization begins is shown as −300 V, while the peak negative voltage that may be applied across the stack 20 at some shallower depths has a magnitude greater than 500 V. In another embodiment at block 710, modifying the stack signal such that the negative polarity portion of the first bipolar signal 30f does not exceed a negative polarity limit comprises the controller 160 reducing the output voltage of the voltage converter 104 by adjusting the reference signal applied to the PWM modulator 162 used to generate the PWM waveform so that the peak-to-peak voltage of the first bipolar signal 30f is reduced from 1,000 V to 500 V, thereby reducing the maximum voltage swing across the stack 20 and resulting in the second bipolar signal 30g.

Referring now to FIGS. 10A and 10B, there are shown a first bipolar signal 30h that has a peak negative voltage of −500 V (FIG. 10A) and a second signal 30i that has a peak negative voltage of −250 V (FIG. 10B). In another embodiment at block 710, in order to modify the stack signal 30h such that the negative polarity portion of the signal does not exceed a negative polarity limit, the controller 160 clips a negative polarity portion of the first bipolar signal 30h, which in FIG. 10A has negative polarity, resulting in the signal 30i of FIG. 10B. As described above in respect of FIGS. 8 and 9, the controller 160 does this by adjusting the reference signal applied to the PWM modulator 162 used to generate the PWM waveform.

Regardless of how the controller 160 performs block 710, after completing block 710 the controller 160 proceeds to block 712 where the method 700 ends.

While FIGS. 8-10B show a single negative polarity limit, the negative polarity limit may vary with depth. More specifically, the magnitude of the negative polarity limit typically decreases as the transmitter 100 descends a well and increases as the transmitter 100 ascends a well.

While FIGS. 4-6 show example embodiments of the transmission system 101 and various components thereof, in different embodiments (not depicted) variants of those components may be used. For example, the transmission system and components thereof described in co-owned published patent application WO 2014/121403, the entirety of which is hereby incorporated by reference, may be used in place of some of the analogous components described herein.

FIG. 7 is a flowchart of an example method. Some of the blocks illustrated in the flowchart may be performed in an order other than that which is described. Also, it should be appreciated that not all of the blocks described in the flowchart are required to be performed, that additional blocks may be added, and that some of the illustrated blocks may be substituted with other blocks.

For the sake of convenience, the example embodiments above are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. An acoustic transmitter for transmitting an acoustic signal through a drill pipe, the transmitter comprising:
    (a) a piezoelectric stack;
    (b) a voltage boost circuitry for boosting a voltage from a voltage source;
    (c) a signal modulation circuitry electrically coupled to the voltage boost circuitry and to the piezoelectric stack, the signal modulation circuitry for applying a stack signal comprising voltage from the voltage source across the piezoelectric stack;
    (d) at least one of a temperature sensor and a compression sensor positioned to measure a temperature of the piezoelectric stack and a compressive stress applied to the piezoelectric stack, respectively; and
    (e) a control circuitry communicatively coupled to the voltage boost circuitry, signal modulation circuitry, and to the at least one of the temperature sensor and the compression sensor, the control circuitry configured to perform a method comprising:
        (i) monitoring at least one of the temperature of the piezoelectric stack and the compressive stress applied to the piezoelectric stack;
        (ii) comparing at least one of the temperature of the piezoelectric stack and the compressive stress applied to the piezoelectric stack to a temperature threshold and a stress threshold, respectively; and
        (iii) when the stack signal is an alternating voltage signal and when at least one of the temperature of the stack and the compressive stress applied to the stack respectively exceeds the temperature threshold and the stress threshold, modifying the stack signal such that a negative polarity portion of the stack signal has a maximum magnitude less than a magnitude of a negative polarity limit.

2. The transmitter of claim 1, wherein the at least one of a temperature sensor and a compression sensor comprises at least the temperature sensor.

3. The transmitter of claim 1, wherein the at least one of a temperature sensor and a compression sensor comprises at least the compression sensor.

4. The transmitter of claim 1, wherein the at least one of a temperature sensor and a compression sensor comprises the temperature sensor and the compression sensor.

5. The transmitter of claim 1 wherein the voltage boost circuitry comprises a DC/DC voltage converter that sets a maximum voltage swing across the stack, and wherein modifying the stack signal comprises adjusting the DC/DC voltage converter such that the maximum voltage swing across the piezoelectric stack is reduced.

6. The transmitter of claim 1 wherein modifying the stack signal comprises adding a DC offset to the stack signal.

7. The transmitter of claim 6 wherein the voltage boost circuitry comprises a DC/DC voltage converter that sets a maximum voltage swing across the piezoelectric stack, and modifying the stack signal further comprises adjusting the DC/DC voltage converter to reduce the maximum voltage swing across the piezoelectric stack such that a positive polarity portion of the stack signal is unclipped.

8. The transmitter of claim 7 wherein the DC/DC voltage converter is adjusted such that the peak magnitude of the positive polarity portion of the stack signal after the DC offset is added to the stack signal is identical to a peak magnitude of the positive polarity portion of the signal before the DC offset is added to the stack signal.

9. The transmitter of claim 1 wherein modifying the stack signal comprises clipping the negative polarity portion of the stack signal.

10. A method for transmitting an acoustic signal through a drill pipe, the method comprising:
    (a) monitoring at least one of a temperature of a piezoelectric stack for generating the acoustic signal and a compressive stress applied to the piezoelectric stack;
    (b) comparing the at least one of the temperature of the piezoelectric stack and the compressive stress applied to the piezoelectric stack to a temperature threshold and a stress threshold, respectively; and when the stack signal is an alternating voltage signal and when at least one of the temperature of the piezoelectric stack and the compressive stress applied to the piezoelectric stack respectively exceeds the temperature threshold and the stress threshold, modifying the stack signal such that a negative polarity portion of the stack signal has a maximum magnitude less than a magnitude of a negative polarity limit.

11. The method of claim 10 wherein the maximum magnitude of the negative polarity portion of the stack signal is reduced in response to the temperature of the piezoelectric stack.

12. The method of claim 10 wherein the maximum magnitude of the negative polarity portion of the stack signal is reduced in response to the compressive stress applied to the piezoelectric stack.

13. The method of claim 10 wherein the maximum magnitude of the negative polarity portion of the stack signal is reduced in response to the temperature of the piezoelectric stack and the compressive stress applied to the piezoelectric stack.

14. The method of claim 10 wherein a maximum voltage swing across the stack signal is set by a DC/DC voltage converter, and wherein reducing the maximum magnitude of the negative polarity portion of the stack signal comprises adjusting the DC/DC voltage converter such that the voltage swing across the piezoelectric stack is reduced.

15. The method of claim 10 wherein reducing the maximum magnitude of the negative polarity portion of the stack signal comprises adding a DC offset to the stack signal.

16. The method of claim 15 wherein a maximum voltage swing across the stack signal is set by a DC/DC voltage converter, and wherein reducing the maximum magnitude of the negative polarity portion of the stack signal further comprises adjusting the DC/DC voltage converter to reduce the maximum voltage swing across the piezoelectric stack such that a positive polarity portion of the stack signal is unclipped.

17. The method of claim 16 wherein the DC/DC voltage converter is adjusted to reduce the maximum voltage swing across the piezoelectric stack such that the peak magnitude of the positive polarity portion of the stack signal after the DC offset is added to the stack signal is identical to a peak magnitude of the positive polarity portion of the signal before the DC offset is added to the stack signal.

18. The method of claim 10 wherein reducing the maximum magnitude of the negative polarity portion of the stack signal comprises clipping the negative polarity portion of the stack signal.

19. A non-transitory computer readable medium having encoded thereon computer program code that is executable by a processor and that, when executed by the processor, causes the processor to perform a method for transmitting an acoustic signal through a drill pipe, the method comprising:
(a) monitoring at least one of a temperature of a piezoelectric stack for generating the acoustic signal and a compressive stress applied to the piezoelectric stack;
(b) comparing the at least one of the temperature of the piezoelectric stack and the compressive stress applied to the piezoelectric stack to a temperature threshold and a stress threshold, respectively; and
(c) when the stack signal is an alternating voltage signal and when at least one of the temperature of the piezoelectric stack and the compressive stress applied to the piezoelectric stack respectively exceeds the temperature threshold a n d the stress threshold, modifying the stack signal such that a negative polarity portion of the stack signal has a maximum magnitude less than a magnitude of a negative polarity limit.

* * * * *